United States Patent
Noda et al.

(10) Patent No.: US 10,366,837 B2
(45) Date of Patent: Jul. 30, 2019

(54) MULTILAYER ELECTRONIC COMPONENT

(71) Applicant: TDK CORPORATION, Tokyo (JP)

(72) Inventors: Yohei Noda, Tokyo (JP); Hirobumi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/840,111

(22) Filed: Dec. 13, 2017

(65) Prior Publication Data

US 2018/0166218 A1    Jun. 14, 2018

(30) Foreign Application Priority Data

Dec. 14, 2016   (JP) .................................. 2016-242421

(51) Int. Cl.

| | |
|---|---|
| *H01G 4/30* | (2006.01) |
| *H01G 4/10* | (2006.01) |
| *H01G 4/012* | (2006.01) |
| *H01G 4/12* | (2006.01) |
| *H01G 4/008* | (2006.01) |
| *H01G 4/224* | (2006.01) |
| *H01G 4/242* | (2006.01) |
| *H01G 4/232* | (2006.01) |

(52) U.S. Cl.
CPC ............. *H01G 4/30* (2013.01); *H01G 4/0085* (2013.01); *H01G 4/012* (2013.01); *H01G 4/10* (2013.01); *H01G 4/12* (2013.01); *H01G 4/224* (2013.01); *H01G 4/008* (2013.01); *H01G 4/105* (2013.01); *H01G 4/232* (2013.01); *H01G 4/242* (2013.01)

(58) Field of Classification Search
CPC ........ H01G 4/005; H01G 4/006; H01G 4/012; H01G 4/12; H01G 4/30; H01G 4/35; H01G 4/232; H01G 4/224
See application file for complete search history.

(56) References Cited

U.S. PATENT DOCUMENTS

| | | | |
|---|---|---|---|
| 4,347,650 A | 9/1982 | Mc Larney et al. | |
| 2001/0016251 A1* | 8/2001 | Sugimoto ............. | C04B 35/457 428/209 |
| 2003/0062112 A1 | 4/2003 | Matsumoto | |
| 2004/0185278 A1* | 9/2004 | Sato ......................... | H01G 2/20 428/469 |
| 2006/0067029 A1* | 3/2006 | Kuniyasu ............... | H01G 4/232 361/302 |
| 2008/0239617 A1* | 10/2008 | Motoki .................. | H01G 4/232 361/301.4 |
| 2010/0025075 A1 | 2/2010 | Feichtinger et al. | |

(Continued)

FOREIGN PATENT DOCUMENTS

| | | |
|---|---|---|
| CN | 1421881 A | 6/2003 |
| JP | H02-30570 A | 1/1990 |

(Continued)

*Primary Examiner* — Nguyen T Ha
(74) *Attorney, Agent, or Firm* — Oliff PLC

(57) ABSTRACT

The present invention relates to a multilayer electronic component which includes an element body where a plurality of internal electrode layers and dielectric layers are alternately laminated. Insulating layers are disposed on at least one side surface of the element body. The insulating layers contain a glass composition and a ceramic composition. The internal electrode layers contain a metal M and the ceramic composition contains an oxide of the metal M.

12 Claims, 4 Drawing Sheets

(56) References Cited

U.S. PATENT DOCUMENTS

2014/0146436 A1* 5/2014 Kim .................. H01G 4/30
  361/301.4
2015/0084481 A1* 3/2015 Mori .................. H01C 1/148
  310/311

FOREIGN PATENT DOCUMENTS

| JP | H03-82006 A | 4/1991 |
| JP | H11-340089 A | 12/1999 |

* cited by examiner

MULTILAYER ELECTRONIC COMPONENT

BACKGROUND OF THE INVENTION

1. Field of the Invention

The present invention relates to a multilayer electronic component.

2. Description of the Related Art

In recent years, as the electronic circuits used in digital electronic devices such as mobile phones tend to become high density, higher demand is made on the miniaturization of electronic components, and the multilayer electronic components used to form the circuit develop rapidly toward miniaturization and high capacity.

For example, in multilayer electronic components such as a multilayer ceramic capacitor, a plurality of internal electrodes is disposed inside a ceramic sintered body.

In patent document 1, a multilayer ceramic capacitor with a no-side-gap structure is proposed to improve the utilizing efficiency of the electrode materials or to raise the electrostatic capacitance or the accuracy, etc.

In patent document 2, a structure able to increase withstand voltage is proposed. That is, after a ceramic sintered body in which the internal electrode comes out from a pair of side surfaces is obtained, the section near the side edge of the internal electrode is removed. Next, insulating materials are injected into the removed section to form an insulating layer, thus increasing the withstand voltage.

In patent document 3, a method for manufacturing a ceramic sintered body is proposed, wherein glass is precipitated on the external surface of the ceramic sintered body because the ceramic composition of the ceramic sintered body contains glass composition of a specific weight ratio, by which a ceramic sintered body covered by an insulating layer with glass as the main composition is obtained.

However, when glass is used in the insulating layer, cracks emerge if very strong strain is applied to the chip.

[Patent document 1] Japanese examined patent application No. 2-30570

[Patent document 2] Japanese laid-open patent application No. 3-82006

[Patent document 3] Japanese laid-open patent application No. 11-340089

SUMMARY OF THE INVENTION

In view of the above situation, the present invention aims to provide a multilayer electronic component with excellent strain strength when glass is used in an insulating layer.

Means for Solving the Problem

In order to achieve the above purpose, the multilayer electronic component of the present invention is as follows.

[1] A multilayer electronic component including an element body where a plurality of internal electrode layers and dielectric layers are alternately laminated, in which
insulating layers are disposed on at least one side surface of the element body,
the insulating layers contain a glass composition and a ceramic composition, and
the internal electrode layers contain a metal M and the ceramic composition contains an oxide of the metal M.

According to the present invention, a multilayer electronic component with excellent strain strength is provided.

The following embodiments are illustrated as specific embodiments of the above-mentioned [1].

[2] The multilayer electronic component according to [1], wherein the oxide of the metal M is NiO, $Ag_2O$ or CuO.

[3] The multilayer electronic component according to [1] or [2], wherein when the whole insulating layer is 100 wt %, a content of the oxide of the metal M in the insulating layer is 0.1-20 wt %.

[4] The multilayer electronic component according to any one of [1]-[3], wherein 5% or more of an end of the internal electrode layer near the side surface equipped with the insulating layer is recessed 1 μm or more from an end of the dielectric layer near the side surface equipped with the insulating layer.

[5] The multilayer electronic component according to any one of [1]-[4], wherein when the whole glass composition is 100 wt %, a $SiO_2$ content in the glass composition is 35-75 wt %.

[6] The multilayer electronic component according to any one of [1]-[5], wherein when the whole glass composition is 100 wt %, a content of alkali metal composition in the glass composition is 10-35 wt %.

DESCRIPTION OF THE PREFERRED EMBODIMENTS

Figure 1:
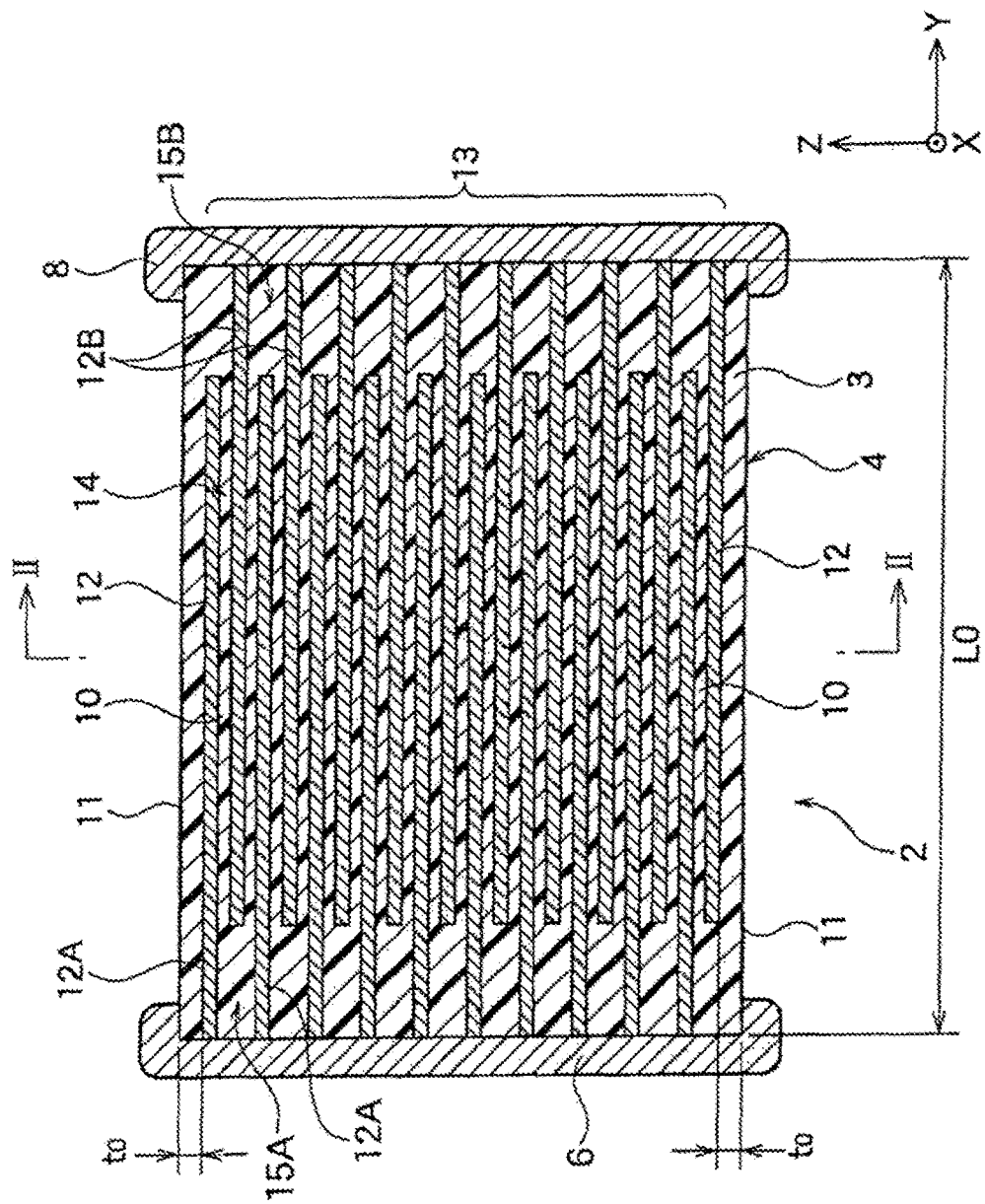
FIG. 1 is a schematic cross sectional view of a multilayer ceramic capacitor according to an embodiment of the invention.

The present invention will be described in detail based on the present embodiment referring to the drawings, but the present invention is not limited to the following embodiments.

In addition, the structural elements described below include those which can easily assumed by one of ordinary skill in the art and those substantially the same. Furthermore, the structural elements described below can be properly combined.

The present invention is described below based on the embodiments shown in the figures.

The Overall Structure of a Multilayer Ceramic Capacitor

The overall structure of a multilayer ceramic capacitor is described as one embodiment of a multilayer electronic component of the present embodiment.

Figure 2:
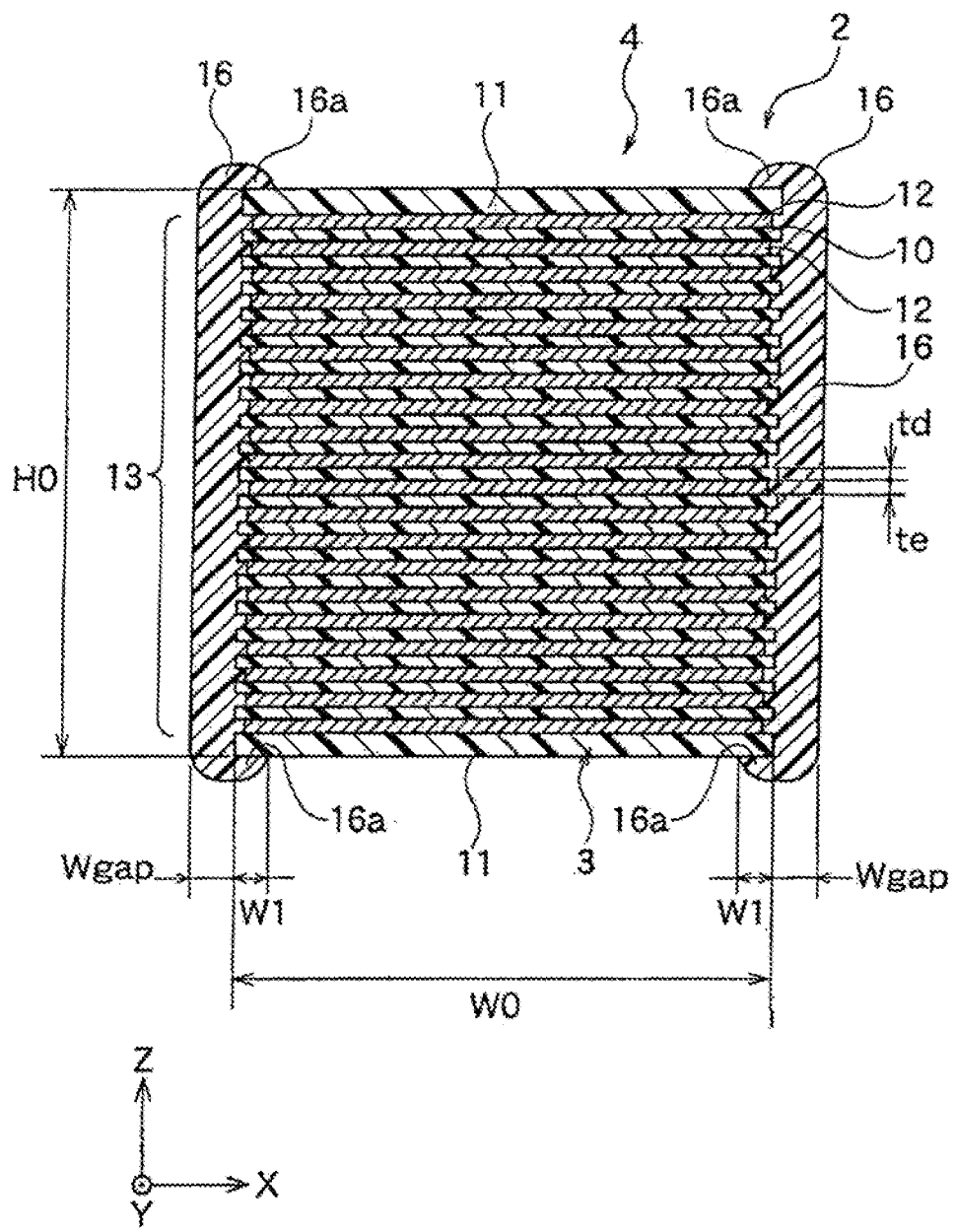
FIG. 2 is a cross sectional view along the II-II line in FIG. 1.

As shown in FIG. 1, the multilayer ceramic capacitor 2 of the present embodiment includes a ceramic sintered body 4, a first external electrode 6, and a second external electrode 8. In addition, as shown in FIG. 2, the ceramic sintered body 4 includes an element body 3 and insulating layers 16.

The element body 3 includes inside dielectric layers 10 and internal electrode layers 12, which are substantially parallel to a plane including the X axis and the Y axis. The internal electrode layers 12 are alternately laminated between the inside dielectric layers 10 along the direction of the Z axis. Here, "substantially parallel" means that most parts are parallel, but parts that are slightly un-parallel may also exist, that is, the internal electrode layers 12 and the inside dielectric layers 10 may have a little concavity and convexity or may tilt slightly.

The parts where the inside dielectric layers 10 and the internal electrode layers 12 are alternately laminated are interior regions 13.

In addition, the element body 3 has exterior regions 11 on both end surfaces in the lamination direction Z (the Z axis). The exterior regions 11 are formed by laminating a plurality of outside dielectric layers which are thicker than the inside dielectric layers 10 forming the interior regions 13.

Moreover, "the inside dielectric layers 10" and "the outside dielectric layers" are referred to as "the dielectric layers" in some cases below.

The material of the dielectric layers forming the inside dielectric layers 10 and the exterior regions 11 may be the same or different, and are not specially limited. For example, they can be formed by taking dielectric material with a perovskite structure represented by a chemical formula such as $ABO_3$ as the main composition.

In the $ABO_3$, A is not specially limited, however, it exemplifies at least one element chosen from a group of Ca, Ba and Sr. And B is not specially limited, however, it exemplifies at least one element chosen from a group of Ti and Zr. The molar ratio of AB is not specially limited, however, it is 0.980-1.020 for example. In addition, rare earth oxides, alkali oxides, magnesium oxide and transition metal oxides, etc. may be exemplified as the subcomposition in the dielectric material. Also, mixtures containing the above oxides are exemplified. Complex oxides containing any one of the above element are exemplified. Furthermore, sintering aids containing $SiO_2$ are exemplified as glass. The rare earth element is at least one chosen from Sc, Y, La, Ce, Pr, Nd, Pm, Sm, Eu, Gd, Tb, Dy, Ho, Er, Tm, Yb and Lu. The transition metals may be V, W, Mn and Mo or other transition metals.

One end of the alternately laminated internal electrode layers 12 has extraction sections 12A electrically connected to the inner side of the first external electrode 6 which is formed on the external side of a first end of the ceramic sintered body 4 in the Y axis direction. And the other end of the alternately laminated internal electrode layers 12 has extraction sections 12B electrically connected to the inner side of the second external electrode 8 which is formed on the external side of a second end of the ceramic sintered body 4 in the Y axis direction.

The interior regions 13 have a capacity region 14 and extraction regions 15A, 15B. The capacity region 14 is a region where the internal electrode layers 12 are laminated with the inside dielectric layers 10 in-between along the lamination direction. The extraction region 15A is a region located between the extraction sections 12A of the internal electrode layers 12 connected to the external electrode 6. The extraction region 15B is a region located between the extraction sections 12B of the internal electrode layers 12 connected to the external electrode 8.

The conductive material contained in the internal electrode layers 12 are not specially limited and can be metals such as Ni, Cu, Ag, Pd, Al, Pt, or their alloys. It is especially preferred to utilize Ni or Ni alloys. When Ni alloys are utilized, alloys of more than one element chosen from Mn, Cr, Co and Al with Ni are preferred, and a Ni content of 95 wt % or higher in the alloys is preferred. Additionally, Ni or the Ni alloys may contain various trace compositions such as P with a content approximately 0.1 wt % or less.

As shown in FIG. 2, on the two end surfaces of the ceramic sintered body 4 in the X axis direction, i.e. the side surfaces where the ends of the internal electrodes 12 come out, the insulating layers 16 which cover the ends of the internal electrode layers 12 of the element body 3 are disposed. The side surface where the insulating layers 16 are disposed may be only one of the end surfaces in the X axis direction. Besides, the insulating layers 16 may also be formed on the upper section and/or lower section of the ceramic sintered body 4 in the Z axis direction (the lamination direction).

The insulating layers 16 contain the glass composition and the ceramic composition.

Since the insulating layers 16 contain both the glass composition and the ceramic composition, the moisture resistance can be prevented from decreasing. The inventors think the reason for moisture resistance improvement is that since the insulating layers 16 contain the ceramic composition, the cracks can be prevented from reaching the element body 3 even if cracks emerge inside the insulating layers 16. Moreover, the ceramic composition is contained in the form of, for example, a ceramic filler.

There is no special limit on the content of the ceramic composition in the insulating layers 16.

The ceramic composition in the insulating layers 16 contains the oxide of the metal used in the conductive material contained in the internal electrode layers 12. In other words, the internal electrode layers 12 contain the metal M, and the ceramic composition contains the oxide of M. The oxide of M may be complex oxides containing M.

By containing the same kind of metal element M in both the conductive material contained in the internal electrode layers 12 and the metal oxide in the insulating layers 16, the strain strength can be greatly raised.

The mechanism of strain strength improvement is not clear yet, and the mechanism below is inferred. First, at the stage before the formation of the insulating layers 16, the surface of the internal electrode layers 12 coming out from the face where the insulating layers 16 are formed is partially oxidized by the oxygen in exterior atmosphere. Then, the oxide of the conductive material formed on the surface of the internal electrode layers 12 and the metal oxide in the insulating layers 16 become oxides that contain the same kind of metal. By containing oxides of the same kind of metal in the insulating layers 16 and on the surface of the internal electrode layers 12, the adhesiveness of the insulating layers 16 and the internal electrode layers 12 is improved, and the strain strength is greatly raised.

Although there is no special limit on the content ratio of metal M in the internal electrode layers 12, it is preferred that metal M is the main composition of the internal electrode layers 12. To be specific, the ratio of metal M to the overall metals contained in the internal electrode layers 12 is preferred to be 60 wt % or more, especially preferred to be 90 wt % or more.

Although there is no special limit on the content ratio of the M oxide in the ceramic composition of the insulating layers 16, the content is preferably 0.10-20 wt %, more preferably 0.10-10 wt %, and the most preferably 0.20-10 wt % when the overall insulating layers 16 is 100 wt %. When the content of the M oxide is within the above range, it is especially easy to raise the strain strength.

There is no special limit on the kind of metal M, and it is preferably chosen from Ni, Ag and Cu, and especially preferably chosen from Ni. Moreover, when the metal M is Ni, the M oxide is preferably NiO. When the metal M is Ag, the M oxide is preferably $Ag_2O$. When the metal M is Cu, the M oxide is preferably CuO. In the above situations, the adhesiveness of the internal electrodes and the insulating layers is especially improved, so does the strain strength.

Besides, in view of crack prevention, the ceramic composition in the insulating layers 16 preferably contains the oxide containing at least one element chosen from Al, Zr, Ti, Ce, Fe, Mn, Cu, Co and Zn. The emergence of crack coming from the inside of a gap section of the insulating layers 16 can be inhibited. The reason for the crack inhibition is not clear, and the inventors think the reason is that the reaction between the oxide containing at least one element chosen from Al, Zr, Ti, Ce, Fe, Mn, Cu, Co and Zn with glass is relatively slow. Furthermore, by containing the oxide with at least one element chosen from Al, Zr, Ti, Ce, Fe, Mn, Cu, Co and Zn, the strain stress and the strain strength can also be improved.

In addition, in view of crack prevention, it is more preferred to contain the oxide including at least one element chosen from Cu, Co, Ce, Mn, Al, Zr and Ti, and further preferred to contain the oxide including at least one element chosen from Cu and Co. When the oxide including at least one element chosen from Cu and Co is contained, comparing with situations when only the oxide with other elements is used, the prevention ratio of cracks reaching the green body can be further improved.

Although there is no special limit on the glass composition of the insulating layers 16, a content of 35-75 wt % of $SiO_2$ is preferred when the overall glass composition is 100 wt %.

By containing 35 wt % or more of $SiO_2$ in the glass composition of the insulating layers 16, the plating tolerance is increased. Besides, by containing 75 wt % or less of $SiO_2$, the emergence of cracks inside the insulating layers 16 is easily inhibited. Although it is not clear about the reason why the emergence of cracks is easily inhibited by containing 75 wt % or less of $SiO_2$, the inventors considers that the brittleness of the insulating layers 16 tends to be high when the content of $SiO_2$ exceeds 75%.

When the overall glass composition is 100 wt %, it is preferable for the insulating layers 16 to contain 10-35 wt % of alkali metal composition. Moreover, the alkali metal composition includes simple substance of alkali metal and compounds containing alkali metal. Compounds containing alkali metal may be alkali metal oxides such as $Na_2O$, $K_2O$ and $Li_2O$.

By containing more than 10 wt % of alkali metal in the glass composition of the insulating layers 16, the strain strength on the chip increases. Although the reason for the increase of the strain strength on the chip is not clear, the inventors considers that it is because it becomes easy to apply compressive stress to the insulating layers 16 when the softening point of the glass composition decreases and it becomes easy to properly react with the ceramic composition. Besides, by containing 35 wt % or less of alkali metal, the electrical resistivity of the glass composition increases, and the withstand voltage can be increased.

When the overall glass composition of the insulating layers 16 is 100 wt %, the content of BaO is preferably 10-50 wt %.

By containing 10 wt % or more of BaO in the glass composition of the insulating layers 16, the plating tolerance tends to increase. Besides, by containing 50 wt % or less of BaO, the plating tolerance tends to increase.

When the overall glass composition of the insulating layers 16 is 100 wt %, the content of $Al_2O_3$ is preferably 1-10 wt %.

By making the content of $Al_2O_3$ in the glass composition of the insulating layers 16 from 1 wt % or more to 10 wt % or less, the plating tolerance increases.

Other compounds may be contained as the glass composition of the insulating layers 16. For example, CaO, SrO, $B_2O_3$ can be exemplified. There is no special limit on the content amount of other compounds.

There is no special limit on the material of the external electrodes 6, 8, and at least one element from Ni, Pd, Ag, Au, Cu, Pt, Rh, Ru, Ir, or the alloy of these elements can be used. Usually, Cu, Cu alloy, Ni, Ni alloy, Ag, Ag—Pd alloy, In—Ga alloy, etc. are used.

Moreover, in FIG. 1, the X axis, the Y axis and the Z axis are vertical to each other, the Z axis corresponds to the lamination direction of the inside dielectric layers 10 and the internal electrode layers 12, and the Y axis corresponds to the direction in which the extraction regions 15A, 15B (extraction sections 12A, 12B) are formed.

The shape and size of the element body 3 may be suitably decided according to its purpose or application, and it is preferable that the width W0 in the X axis direction ranges from 0.1 mm to 1.6 mm, the length L0 in the Y axis direction ranges from 0.2 mm to 3.2 mm, and the height H0 in the Z axis direction ranges from 0.1 mm to 1.6 mm.

In the present embodiment, as shown in FIG. 2, the section in the insulating layers 16, from the end surface of the element body 3 in the X axis direction to the external surface of the insulating layers 16 along the width direction (the X axis direction) of the ceramic sintered body 4, is called a gap section.

In the present embodiment, the width Wgap of the gap section in the X axis direction corresponds to the size from the end surface of the element body 3 in the X axis direction to the end surface of the insulating layers 16 in the X axis direction along the width direction (X axis direction) of the ceramic sintered body 4, but it is not necessary for the width Wgap to be even along the Z axis direction, and a little fluctuation is allowed. The width Wgap is preferably 0.5-30 much lower than the width W0 of the element body 3.

By setting Wgap in the above range, cracks are hard to emerge, and even if the ceramic sintered body 4 is more miniaturized, the electrostatic capacitance decreases little.

In the present embodiment, as shown in FIG. 2, covering sections 16a, which cover the ends of the two end surfaces of the element body 3 in the Z axis direction, are formed integrally with the insulating layers 16 at both ends of the insulating layers 16 in the Z axis direction. The respective width W1 in the X axis direction from the two end surfaces of the element body 3 in the X axis direction to the covering section 16 is at least zero and is at most ½ of the width W0. In addition, the width W1/W0 is preferably ¹⁄₁₀₀-¹⁄₁₀. By setting W1/W0 in such a range, high sealability can be maintained and thermal shock resistance be raised.

Moreover, the width Wgap on the two sides of the ceramic sintered body 4 in the X axis direction can be the same or different from each other. Besides, the width W1 on the two sides of the ceramic sintered body 4 in the X axis direction can also be the same or different from each other. It is preferred that the insulating layers 16 do not cover the two end surfaces of the element body 3 shown in FIG. 1 in the Y axis direction. The reason is that it is necessary to form the external electrodes 6, 8 on the two end surfaces of the element body 3 in the Y axis direction to connect with the internal electrodes 12. The external electrodes 6, 8 may partly cover the ends of the covering sections 16a in Y axis direction shown in FIG. 2, or may partly cover the ends of the insulating layers 16 in the Y axis direction.

Although there is no special limit on the ratio of a thickness td of the inside dielectric layers 10 to a thickness to of the internal electrode layers 12, td/te is preferably 2-0.5. Although there is also no special limit on the ratio of a thickness to of the exterior regions 11 to a height H0 of the element body 3, to/H0 is preferably 0.01-0.05.

Figure 3:
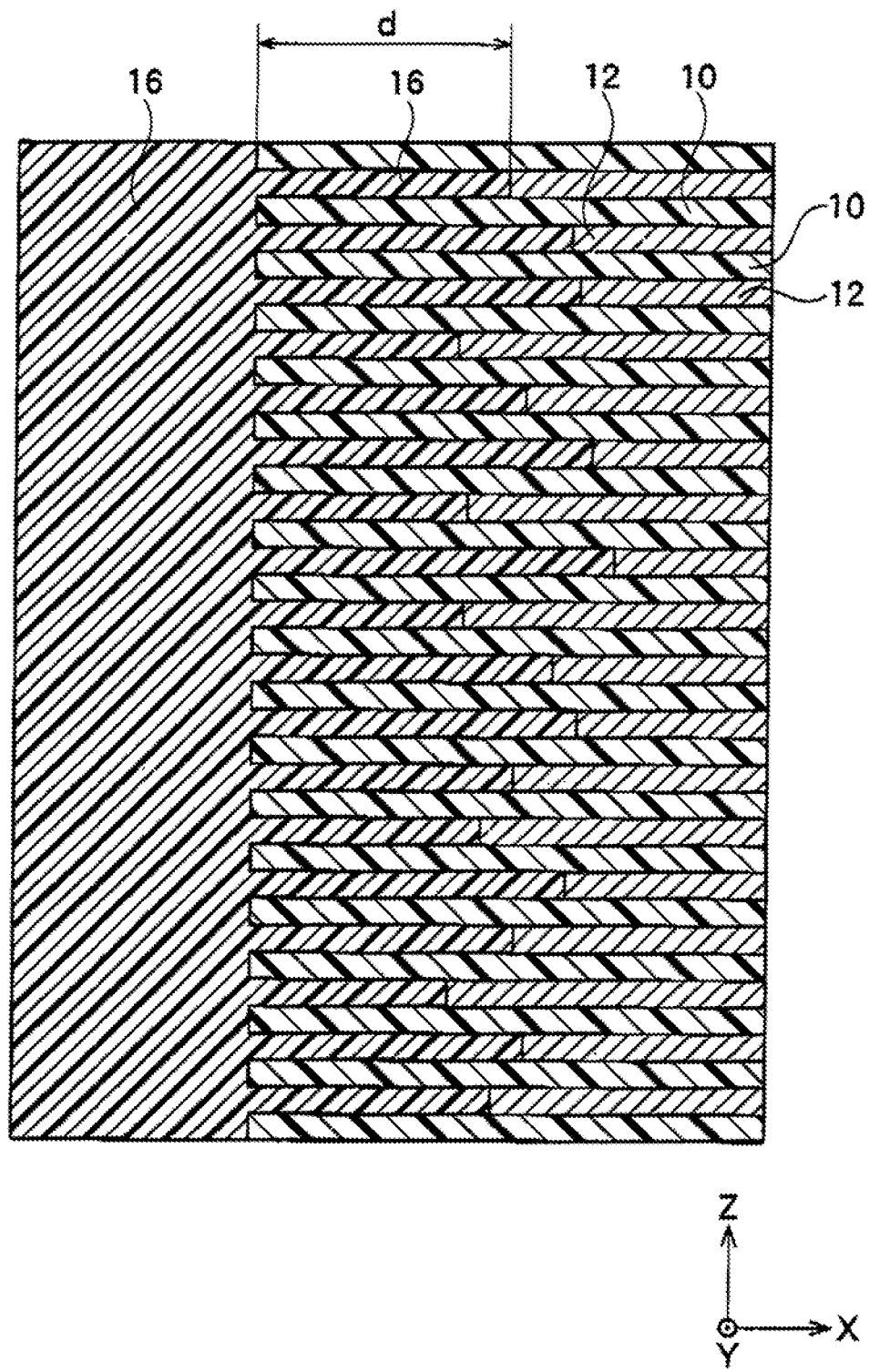
FIG. 3 is an enlarged view of the main part in FIG. 2.

In the present embodiment, as shown in FIG. 3, t ends of the internal electrode layers 12 (the internal electrode layer ends 12a) in the X axis direction sandwiched in the inside dielectric layers 10 adjoining in the lamination direction (the Z axis direction) are recessed from the end surface of the element body 3 in the X axis direction, i.e. the ends (the inside dielectric layer ends 10a) of the inside dielectric layers 10 in the X axis direction are recessed inwardly along the X axis direction for a drawing distance d.

The recess of the internal electrode layer ends 12a is formed due to, for example, the difference of sintering shrinkage between materials forming the internal electrode layers 12 and the materials forming the inside dielectric layers 10. The drawing distance d of the internal electrode layer ends 12a can also be adjusted by polishing the end surface of the element body 3 in the X axis direction with such as barrel polishing before the insulating layers 16 are formed.

The inside dielectric layer ends 10a and the internal electrode layer ends 12a are sometimes uneven, so the outmost part of the inside dielectric layer ends 10a and the same of the internal electrode layer ends 12a are set as reference. That is, the distance from the outmost part of the inside dielectric layer ends 10a in the X axis direction to the outmost part of the internal electrode layer ends 12a in the X axis direction is defined the drawing distance d.

In the present embodiment, it is not necessary for the insulating layers 16 to get into the inside of all the internal electrode layers 12, and a part of the internal electrode layers 12 may emerge in the end surface of the element body 3 in the X axis direction.

Here, in the present embodiment, when the drawing distance d is measured for all the internal electrode layer ends 12a, the ratio of the internal electrode layer ends 12a with a distance of 1 µm or more is defined the internal electrode recessing rate.

In the present embodiment, the internal electrode recessing rate is preferably 5% or more. When the internal electrode recessing rate is 5% or more, the glass composition of the insulating layers 16 gets into the internal electrode layers 12, thereby the adhesiveness of the insulating layers 16 and the element body 3 improves and the strain strength further increases.

The Method for Manufacturing the Multilayer Ceramic Capacitor

Next, the method for manufacturing the multilayer ceramic capacitor 2 as one embodiment of the present invention is described in detail.

First, a paste for inside green sheet and a paste for outside green sheet are prepared to manufacture an inside green sheet which forms, after firing, the inside dielectric layers 10 shown in FIG. 1 and an outside green sheet which forms the outside dielectric layers.

The paste for the inside green sheet and the paste for the outside green sheet are generally made by an organic solvent based paste, obtained by kneading the ceramic powder with organic vehicle, or by a water based paste.

The raw material of the ceramic powder can be suitably chosen from compounds that become complex oxides or oxides, such as carbonates, nitrates, hydroxides, organic metal compounds, and be mixed for use. In the present embodiment, the raw material of the ceramic powder is used in the form of powder with an average particle size of 0.45 µm or less, preferably around 0.1-0.3 µm. Moreover, in order to make the inside green sheet extremely thin, it is desirable to use powder that is finer than the thickness of the green sheet.

The organic vehicle is obtained by solving a binder in an organic solvent. There is no special limit on the binder used in the organic vehicle as long as it is suitably chosen from common binders such as ethyl cellulose, polyvinyl butyral. There is also no special limit on the organic solvent as long as it is suitably chosen from organic solvents such as acetone, toluene.

In addition, the paste for green sheet may include additives chosen from various dispersants, plasticizers, dielectrics, subcomposition compounds, glass frit, insulators, etc., when necessary.

The plasticizer may exemplify phthalate esters such as dioctyl phthalate or benzyl butyl phthalate, adipic acid, phosphate and glycol.

Besides, the paste for inside green sheet and the paste for outside green sheet may use the same paste for green sheet or different pastes for green sheet.

Next, the paste for internal electrode layers is prepared to manufacture the internal electrode pattern layers which form, after firing, the internal electrode layers 12 shown in FIG. 1. The paste for internal electrode layers is prepared by kneading the conductive materials including the above mentioned various kinds of conductive metals or alloys with the organic vehicle.

The paste for external electrodes which form, after firing, the external electrodes 6, 8 shown in FIG. 1 is prepared in the same way as the paste for internal electrode layers mentioned above.

The pastes for the inside green sheet and for the internal electrode layer are prepared as mentioned above, and used thereof to alternately laminate the inside green sheets and the internal electrode pattern layers to manufacture an inner multilayer body. Then, after manufacturing the inner multilayer body, the paste for the outside green sheet is used to form the outside green sheets, and a pressure in the lamination direction is applied thereof to obtain a green multilayer body.

There is no special limit on the method to form internal electrode pattern layers. The internal electrode pattern layers may be formed by printing method or transcription method using the paste for internal electrode layer, or by a thin-film forming method such as evaporation or sputtering without using paste for internal electrode layer.

Besides the above method, as for the method of manufacturing the green multilayer body, the green multilayer body may also be obtained by directly laminating a specific number of the inside green sheets and the internal electrode pattern layers on the outside green sheets and applying pressure in the lamination direction.

Next, the green multilayer body is cut to obtain a green chip.

The plasticizer is removed from the green chip and is solidified thereof by solidification drying. The green chip after the solidification drying is put into a barrel container together with media and polish liquid, and is barrel polished by a horizontal centrifugal barrel machine. The green chip after barrel polishing is washed by water and dried. The element body 3 is obtained by performing a binder removing step, a firing step, and when necessary, an annealing step to the green chip after drying.

The binder removing step, the firing step and the annealing step may be performed continuously or independently.

End surface polishing may be performed to the two end surfaces in the Z axis direction and the two end surfaces in the Y axis direction of the element body 3 obtained above by barrel polishing or sandblast and so on. The Ni recessing rate can be properly controlled by changing the condition of the end surface polishing.

Next, the paste for the insulating layer is coated to the two end surfaces of the element body 3 in the X axis direction, baked thereof to form the insulating layers 16, and obtained the ceramic sintered body 4 shown in FIGS. 1 and 2. The paste for insulating layer is obtained, for example, by kneading the glass raw material, the ceramic filler, the binder with ethyl cellulose as the main composition, and the dispersant such as terpineol and acetone with a mixer.

There is no special limit on the way to coat the paste for insulating layer onto the element body 3, and for example, methods such as dipping, printing, coating, evaporation and spraying can be exemplified.

There is no limit on the baking condition of the element body 3 coated with the paste for insulating layer, for example, baking can be performed by being held in a wet $N_2$ or a dry $N_2$ atmosphere at 700° C.-1300° C. for 0.1-3 hours.

End surface polishing may be performed by barrel polishing, sandblast, etc. to the two end surfaces in the Z axis direction and to the same in the Y axis direction of the ceramic sintered body 4 obtained by the above method.

Next, paste for external electrode is coated to the two end surfaces in the Y axis direction of the ceramic sintered body to which the sintered insulating layers 16 is baked, and firing thereof to form the external electrodes 6, 8. The external electrodes 6, 8 may be formed before or after or at the same time with the formation of the insulating layers 16.

There is also no special limit on the method to form the external electrodes 6, 8, proper methods such as coating and baking, plating, evaporation, and sputtering of the paste for the external electrode can be used.

Then, a covering layer is formed by such as plating on the surface of the external electrodes 6, 8 when necessary.

The multilayer ceramic capacitor 2 of the present embodiment manufactured as above is mounted to such as a print substrate by such as a soldering to be utilized in various electronic devices.

In the present embodiment, the insulating layers 16 are formed on the element body 3 by baking the paste for insulating layer on the fired element body 3. By using this method, the moisture resistance becomes good, and the resistance to external environment changes such as thermal shock or physical shock can be improved.

Although the embodiments of the present invention has been described in detail, the present invention is not limited to the embodiments, and various changes can be made without departing from the essence of the present invention.

The multilayer electronic component of the present invention can be applied to other multilayer electronic components, without limiting to the multilayer ceramic capacitor. Other multilayer electronic components are all the electronic components in which dielectric layers are laminated via the internal electrodes, and band-pass filters, inductors, multilayer three-terminal filters, piezoelectric elements, PTC thermistors, NTC thermistors and varistors, etc. can be exemplified.

Examples

The present invention is further illustrated based on specific examples below, but the present invention is not limited thereto.

First, 100 parts by mass of $BaTiO_3$ powder as the main composition of the dielectric material and 0.5 part by mass of $SiO_2$, 0.8 part by mass of $Y_2O_3$, 0.5 part by mass of MgO and 1.0 part by mass of MnO as the subcomposition of the dielectric material were prepared.

Next, the prepared 100 parts by mass of $BaTiO_3$ powder and the raw material of the subcomposition were wet grinded by a ball mill for 15 hours, dried thereof to obtain the raw material (dielectrics raw material) of the dielectric material.

Next, 100 parts by mass of the obtained dielectric raw material, 10 parts by mass of polyvinyl butyral resin, 5 parts by mass of dioctyl phthalate (DOP) as the plasticizer, and 100 parts by weight of alcohol as the solvent were mixed by the ball mill, pasted thereof and obtained the paste for the green sheet.

In addition, when the internal electrode includes Ni only, 44.6 parts by mass of Ni particles, 52 parts by mass of terpineol, 3 parts by mass of ethyl cellulose, and 0.4 part by mass of benzotriazole were kneaded by a three roll mill, and slurried thereof to make the paste for the internal electrode layer.

When the internal electrode includes Ag only, 45 parts by mass of Ag particles, 30 parts by mass of terpineol, 15 parts by mass of ethyl cellulose and 10 parts by mass of benzotriazole were kneaded by the three roll mill, and slurried thereof to make the paste for the internal electrode layer.

When the internal electrode includes Cu only, 45 parts by mass of Cu particles, 30 parts by mass of terpineol, 15 parts by mass of ethyl cellulose and 10 parts by mass of benzotriazole were kneaded by the three roll mill, and slurried thereof to make the paste for the internal electrode layer.

The paste for green sheet manufactured above was used to form an inside green sheet on the PET film. Next, an internal electrode pattern layer was formed on said inside green sheet using the paste for the internal electrode layer, and obtained an inside green sheet having an internal electrode pattern layer.

The inside green sheet having the internal electrode pattern layer was laminated to manufacture an inner multilayer body, after which the paste for green sheet is used on and under the inner multilayer body to form proper pieces of outside green sheets, and then pressure is applied thereof in the lamination direction to obtain a green multilayer body.

Next, the green multilayer body was cut to obtain green chips.

Next, binder removing treatment, firing and annealing under the conditions below were performed to the obtained green chips to obtain the element body 3.

As to the conditions for binder removing treatment, the rate of temperature increase was 25° C./hour, the retaining temperature was 235° C., the retaining time was eight hours and the atmosphere was the air.

As to the firing conditions, the rate of temperature increase was 600-1000° C./hour, the retaining temperature was 1100-1150° C., and the retaining time was 1 hour. The rate of temperature decrease was 200° C./hour. Besides, the atmosphere gas was humidified mixed gas of $N_2$ and $H_2$, and the oxygen partial pressure was $10^{12}$ MPa.

As to the annealing conditions, the rate of temperature increase was 200° C./hour, the retaining temperature was 1050° C., the retaining time was 3 hours, the rate of temperature decrease was 200° C./hour, and the atmosphere gas was humidified $N_2$ gas (oxygen partial pressure: $10^{-7}$ MPa).

The humidification of the atmosphere gas used in the firing and annealing was done by a wetter.

Next, the glass powder with the glass composition shown in Tables 1 and 2, the ceramic filler having ceramic filler composition, the binder including ethyl cellulose as the main composition, and terpineol and acetone as the dispersant were kneaded by the mixer to prepare the paste for insulating layer. Note, the values shown in Tables 1 and 2 are wt %.

The end surface polishing was performed using etching liquid to the end surfaces of the element body 3 in the X axis direction. Specifically, ferric chloride solution was utilized to perform end surface polishing for 0.05-0.3 hour. Ni recessing rate was changed by changing the conditions of the end surface polishing. After the end surface polishing, the paste for insulating layer was coated and retained in dry $N_2$ atmosphere in 1000° C. for 2 hours and then baked, by which the insulating layers 16 were formed on the element body 3 to obtain the ceramic sintered body 4. The thickness of the gap section of the insulating layers 16 was 10-30 μm.

Next, the external electrodes 6, 8 were formed on the ceramic sintered body 4 to obtain a capacitor sample (the multilayer ceramic capacitor 2). The obtained capacitor samples were evaluated according to the method below.

<The Content Ratio of the Ceramic Composition>

The content ratio of the ceramic composition was calculated by using an SEM-EDX apparatus to analyze the insulating layers 16. As to the specific analyzing method, first, the capacitor sample was polished till the cross section along the II-II line in FIG. 1 (from the end to the place where a length in the Y axis direction is L0/2 in the element body 3). Next, a measuring region of 15 μm×5 μm was set inside the insulating layers 16 so that the (H0/2) position in the Z axis direction became the center. Then, having the measuring region at the center, two measuring regions of 15 μm×5 μm inside the insulating layers 16 in the front and back of said measuring region in the Z axis direction were set without contacting said measuring region. The position of the X axis direction at this moment was not specified in particular, but it is desirable that the position does not adjoin the boundary of the insulating layers 16 and the inside dielectric layers 10 in FIG. 2 so that accurate plane analysis which detects the composition of the dielectric layer can be realized. The SEM-EDX apparatus was used to perform plane analysis to all the three measuring regions, then the content ratio of the ceramic composition in each measuring region were measured considering the results, and figured the average value thereof. Moreover, when the glass composition overlaps the ceramic composition, the content ratio of the ceramic composition was obtained by setting the element with the highest detection precision in the glass composition (for example, $SiO_2$ composition) as the standard of the glass composition and figuring out the content ratio of the glass composition. In addition, when the thickness of the insulating layers 16 was less than 5 μm, the length of each measuring region in the X axis direction was determined the same as the thickness of the insulating layers 16. The length in the Z axis direction was set to 15 μm. The results are shown in the tables.

<Ni Recessing Rate>

The Ni recessing rate was figured out by observing the section which is near the end of the internal electrode layers that exist in the plane having the insulating layers 16, and which is near the end of the dielectric layers. To be specific, first, the capacitor sample was polished till the cross section along the II-II line in FIG. 1 (from the end to the place where a length in the Y axis direction is L0/2 in the element body 3). Next, the section which is near the end of the internal electrode layers in this cross section, and which is near the end of the dielectric layers was observed.

The drawing distance d of the insulating layers in the end of each internal electrode layer in FIG. 3, which is the schematic diagram of the observed section, was measured by such as a microscope. Then the ratio of the ends of the internal electrode layers with a distance d of 1 μm or more with respect to all ends of the internal electrode layers was defined Ni recessing rate.

<Strain Experiment>

Figure 4:
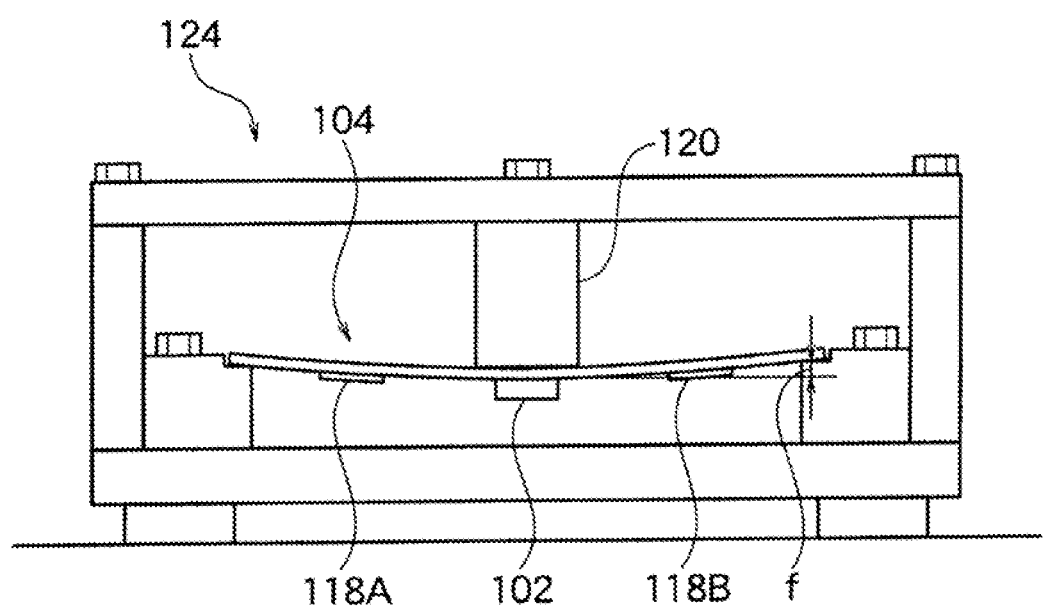
FIG. 4 is a schematic view illustrating a method for strain experiment of the example.

As shown in FIG. 4, the external electrode of the capacitor sample 102 was mounted to the pad section of the substrate 104 for experiment by soldering. The material of the substrate 104 for experiment was epoxy resin with glass cloth substrate. The substrate 104 for experiment was 40 mm wide in the X axis direction, 100 mm long in the Y axis direction and 0.8 mm thick.

The substrate 104 for experiment was disposed in an apparatus 124 shown in FIG. 4, a pressing part 120 was pressed until the substrate 104 for experiment was distracted, and the strain was measured at the time when the substrate 104 for experiment was destructed. The average value of the strain of 10 substrates for experiment was defined the average strain. An average strain of 8 mm or more was regarded as good, 12 mm or more was regarded as better, and 15 mm or more was regarded as the best. The results are shown in the tables. In the tables, x defines the average strain of less than 8 mm, ⊚ defines 8 mm or more to less than 12 mm, ⊚⊚ defines 12 mm or more to less than 15 mm, and ⊚⊚⊚ defines 15 mm or more. Besides, the internal structure of the capacitor sample 102 of the example is the same as the multilayer ceramic capacitor 2 shown in FIG. 1.

<The Change in Glass Weight after the Plating Tolerance Experiment>

The paste for the insulating layer was coated to the ceramic substrate that forms each capacitor sample 2 and performed baking. The surface area of the glass on the ceramic substrate was 1 $cm^2$. The glass substrate was dipped in water solution with pH of three for 60 hours at room temperature. Then, the change in weight of the ceramic substrate, to which glass was baked, was calculated before and after the dipping. The results are shown in the tables. In this example, the preferable range for the decrease in glass weight after the plating tolerance experiment is defined less than 3 mg, and the more preferable range is defined less than 1 mg. The results are shown in the tables. In the tables, ⊚ defines that the decreasing rate of glass weight after the plating tolerance experiment is less than 1 mg, and ○ defines that the plating tolerance of 1 mg or more to less than 3 mg. In this specific example and the comparative example, the decrease in glass weight would not be more than 3 mg.

TABLE 1

| No. | Glass Composition (wt %) SiO₂ | Na₂O | K₂O | Li₂O | Alkali Metal Composition | BaO | Al₂O₃ | Total | Internal electrode Conductive Material | Filler Composition | content/wt % | Ni Recessing Rate (%) | Evaluation | Strain Strength Experiment Average Strain/mm | Plating Tolerance |
|---|---|---|---|---|---|---|---|---|---|---|---|---|---|---|---|
| Example 1 | 44 | 13 | 12 | 3 | 28 | 23 | 5 | 100 | Ni | NiO | 0.05 | 0 | ◎ | 8 | ◎ |
| 2 | 44 | 13 | 12 | 3 | 28 | 23 | 5 | 100 | Ni | NiO | 0.2 | 0 | ◎◎◎ | 16 | ◎ |
| 3 | 44 | 13 | 12 | 3 | 28 | 23 | 5 | 100 | Ni | NiO | 0.8 | 0 | ◎◎◎ | 17 | ◎ |
| 4 | 44 | 13 | 12 | 3 | 28 | 23 | 5 | 100 | Ni | NiO | 2 | 0 | ◎◎◎ | 18 | ◎ |
| 5 | 44 | 13 | 12 | 3 | 28 | 23 | 5 | 100 | Ni | NiO | 5 | 0 | ◎◎◎ | 16 | ◎ |
| 6 | 44 | 13 | 12 | 3 | 28 | 23 | 5 | 100 | Ni | NiO | 7 | 0 | ◎◎◎ | 18 | ◎ |
| 7 | 44 | 13 | 12 | 3 | 28 | 23 | 5 | 100 | Ni | NiO | 12 | 0 | ◎◎ | 14 | ◎ |
| 8 | 44 | 13 | 12 | 3 | 28 | 23 | 5 | 100 | Ni | NiO | 16 | 0 | ◎◎ | 14 | ◎ |
| 9 | 44 | 13 | 12 | 3 | 28 | 23 | 5 | 100 | Ni | NiO | 21 | 0 | ◎ | 11 | ◎ |
| 10 | 44 | 13 | 12 | 3 | 28 | 23 | 5 | 100 | Ni | NiO | 24 | 0 | ◎ | 10 | ◎ |
| 11 | 44 | 13 | 12 | 3 | 28 | 23 | 5 | 100 | Ni | NiO | 32 | 0 | ◎ | 9 | ◎ |
| 12 | 44 | 13 | 12 | 3 | 28 | 23 | 5 | 100 | Ni | NiO | 40 | 0 | ◎ | 9 | ◎ |
| 13 | 44 | 13 | 12 | 3 | 28 | 23 | 5 | 100 | Ni | NiO | 60 | 0 | ◎ | 8 | ◎ |
| 14 | 44 | 13 | 12 | 3 | 28 | 23 | 5 | 100 | Ni | NiO | 5 | 6 | ◎◎◎ | 18 | ◎ |
| 15 | 44 | 13 | 12 | 3 | 28 | 23 | 5 | 100 | Ni | NiO | 30 | 15 | ◎◎ | 13 | ◎ |
| 16 | 44 | 13 | 12 | 3 | 28 | 23 | 5 | 100 | Ni | NiO | 40 | 26 | ◎ | 13 | ◎ |
| 17 | 44 | 13 | 12 | 3 | 28 | 23 | 5 | 100 | Ag | Ag₂O | 0.06 | 0 | ◎ | 8 | ◎ |
| 18 | 44 | 13 | 12 | 3 | 28 | 23 | 5 | 100 | Ag | Ag₂O | 0.2 | 0 | ◎◎◎ | 15 | ◎ |
| 19 | 44 | 13 | 12 | 3 | 28 | 23 | 5 | 100 | Ag | Ag₂O | 1 | 0 | ◎◎◎ | 16 | ◎ |
| 20 | 44 | 13 | 12 | 3 | 28 | 23 | 5 | 100 | Ag | Ag₂O | 4 | 0 | ◎◎◎ | 17 | ◎ |
| 21 | 44 | 13 | 12 | 3 | 28 | 23 | 5 | 100 | Ag | Ag₂O | 11 | 0 | ◎◎ | 12 | ◎ |
| 22 | 44 | 13 | 12 | 3 | 28 | 23 | 5 | 100 | Ag | Ag₂O | 16 | 0 | ◎◎ | 12 | ◎ |
| 23 | 44 | 13 | 12 | 3 | 28 | 23 | 5 | 100 | Ag | Ag₂O | 23 | 0 | ◎◎ | 9 | ◎ |
| 24 | 44 | 13 | 12 | 3 | 28 | 23 | 5 | 100 | Ag | Ag₂O | 7 | 8 | ◎◎◎ | 17 | ◎ |

TABLE 1-continued

| No. | Glass Composition (wt %) | | | | | | | | Internal electrode | | Filler Composition | | Ni Recessing Rate (%) | Strain Strength | | Plating Tolerance |
|---|---|---|---|---|---|---|---|---|---|---|---|---|---|---|---|---|
| | SiO$_2$ | Na$_2$O | K$_2$O | Li$_2$O | Alkali Metal Composition | BaO | Al$_2$O$_3$ | Total | Conductive Material | Composition | Composition | content/wt % | | Evaluation | Average Strain/mm | |
| 25 | 44 | 13 | 12 | 3 | 28 | 23 | 5 | 100 | Ag | Ag$_2$O | 20 | 17 | ◎◎ | 14 | ◎ |
| 26 | 44 | 13 | 12 | 3 | 28 | 23 | 5 | 100 | Ag | Ag$_2$O | 34 | 28 | ◎◎ | 14 | ◎ |
| 27 | 44 | 13 | 12 | 3 | 28 | 23 | 5 | 100 | Cu | CuO | 0.04 | 0 | ◎ | 9 | ◎ |
| 28 | 44 | 13 | 12 | 3 | 28 | 23 | 5 | 100 | Cu | CuO | 0.7 | 0 | ◎◎◎ | 15 | ◎ |
| 29 | 44 | 13 | 12 | 3 | 28 | 23 | 5 | 100 | Cu | CuO | 5 | 0 | ◎◎◎ | 16 | ◎ |
| 30 | 44 | 13 | 12 | 3 | 28 | 23 | 5 | 100 | Cu | CuO | 18 | 0 | ◎◎◎ | 12 | ◎ |
| 31 | 44 | 13 | 12 | 3 | 28 | 23 | 5 | 100 | Cu | CuO | 24 | 0 | ◎◎ | 9 | ◎ |
| 32 | 44 | 13 | 12 | 3 | 28 | 23 | 5 | 100 | Cu | CuO | 31 | 0 | ◎ | 9 | ◎ |
| 33 | 44 | 13 | 12 | 3 | 28 | 23 | 5 | 100 | Cu | CuO | 12 | 12 | ◎◎◎ | 18 | ◎ |
| 34 | 44 | 13 | 12 | 3 | 28 | 23 | 5 | 100 | Cu | CuO | 25 | 45 | ◎◎ | 13 | ◎ |
| 35 | 44 | 13 | 12 | 3 | 28 | 23 | 5 | 100 | Cu | CuO | 32 | 92 | ◎◎ | 13 | ◎ |
| Comparative Example 36 | 44 | 13 | 12 | 3 | 28 | 23 | 5 | 100 | Ni | SrO | 0.5 | 0 | X | 6 | ◎ |
| 37 | 44 | 13 | 12 | 3 | 28 | 23 | 5 | 100 | Ni | SrO | 4 | 0 | X | 7 | ◎ |
| 38 | 44 | 13 | 12 | 3 | 28 | 23 | 5 | 100 | Ni | TiO$_2$ | 3 | 0 | X | 6 | ◎ |
| 39 | 44 | 13 | 12 | 3 | 28 | 23 | 5 | 100 | Ni | TiO$_2$ | 12 | 0 | X | 7 | ◎ |
| 40 | 44 | 13 | 12 | 3 | 28 | 23 | 5 | 100 | Ni | Al$_2$O$_3$ | 0.6 | 0 | X | 7 | ◎ |
| 41 | 44 | 13 | 12 | 3 | 28 | 23 | 5 | 100 | Ni | Al$_2$O$_3$ | 4 | 0 | X | 7 | ◎ |
| 42 | 44 | 13 | 12 | 3 | 28 | 23 | 5 | 100 | Ni | Metal (Fe) | 20 | 0 | X | 5 | ◎ |
| 43 | 44 | 13 | 12 | 3 | 28 | 23 | 5 | 100 | Ni | Heat-resistant resin | 26 | 0 | X | 5 | ◎ |
| 44 | Barium Titanate (non-glass) | | | | | | | — | Ni | BaTiO$_3$ | 100 | 0 | X | 6 | ◎ |
| 45 | 44 | 13 | 12 | 3 | 28 | 23 | 5 | 100 | Ni | — | 0 | 0 | X | 7 | ◎ |

TABLE 2

| | No. | Glass Composition (wt %) | | | | | | | | | | Internal electrode |
|---|---|---|---|---|---|---|---|---|---|---|---|---|
| | | SiO$_2$ | Na$_2$O | K$_2$O | Li$_2$O | Alkali Metal Composition | BaO | SrO | Al$_2$O$_3$ | B$_2$O$_3$ | Total | Conductive Material |
| Example | 46 | 80 | 10 | 7 | 2 | 19 | | | 1 | | 100 | Ni |
| | 47 | 74 | 10 | 7 | 2 | 19 | 5 | | 2 | | 100 | Ni |
| | 48 | 60 | 10 | 7 | 2 | 19 | 7 | 9 | 5 | | 100 | Ni |
| | 49 | 50 | 10 | 7 | 2 | 19 | 18 | | 5 | 8 | 100 | Ni |
| | 50 | 43 | 10 | 7 | 2 | 19 | 20 | 6 | 5 | 7 | 100 | Ni |
| | 51 | 35 | 10 | 7 | 2 | 19 | 20 | 12 | 5 | 9 | 100 | Ni |
| | 52 | 30 | 10 | 7 | 2 | 19 | 20 | 20 | 5 | 6 | 100 | Ni |
| | 53 | 23 | 10 | 7 | 2 | 19 | 20 | 20 | 5 | 13 | 100 | Ni |
| | 54 | 15 | 10 | 7 | 2 | 19 | 23 | 20 | 6 | 17 | 100 | Ni |
| | 55 | 40 | 3 | 5 | 0 | 8 | 20 | 20 | 5 | 7 | 100 | Ni |
| | 56 | 40 | 7 | 4 | 1 | 12 | 20 | 20 | 5 | 3 | 100 | Ni |
| | 57 | 40 | 10 | 5 | 3 | 18 | 20 | 10 | 5 | 7 | 100 | Ni |
| | 58 | 40 | 12 | 9 | 3 | 24 | 20 | 10 | 5 | 1 | 100 | Ni |
| | 59 | 40 | 13 | 12 | 3 | 28 | 20 | | 5 | 7 | 100 | Ni |
| | 60 | 44 | 15 | 15 | 3 | 33 | 18 | | 5 | | 100 | Ni |
| | 61 | 44 | 15 | 16 | 7 | 38 | 13 | | 5 | | 100 | Ni |

| | No. | Filler Composition | | Ni Recessing Rate (%) | Strain Strength Experiment | | Plating Tolerance |
|---|---|---|---|---|---|---|---|
| | | Composition | Content/ wt % | | Evaluation | Average Strain/ mm | |
| Example | 46 | NiO | 5 | 0 | ◎ ◎ ◎ | 16 | ◎ |
| | 47 | NiO | 5 | 0 | ◎ ◎ ◎ | 17 | ◎ |
| | 48 | NiO | 5 | 0 | ◎ ◎ ◎ | 16 | ◎ |
| | 49 | NiO | 5 | 0 | ◎ ◎ ◎ | 17 | ◎ |
| | 50 | NiO | 5 | 0 | ◎ ◎ ◎ | 18 | ◎ |
| | 51 | NiO | 5 | 0 | ◎ ◎ ◎ | 18 | ◎ |
| | 52 | NiO | 5 | 0 | ◎ ◎ ◎ | 18 | ○ |
| | 53 | NiO | 5 | 0 | ◎ ◎ ◎ | 16 | ○ |
| | 54 | NiO | 5 | 0 | ◎ ◎ ◎ | 16 | ○ |
| | 55 | NiO | 5 | 0 | ◎ ◎ ◎ | 15 | ◎ |
| | 56 | NiO | 5 | 0 | ◎ ◎ ◎ | 17 | ◎ |
| | 57 | NiO | 5 | 0 | ◎ ◎ ◎ | 18 | ◎ |
| | 58 | NiO | 5 | 0 | ◎ ◎ ◎ | 17 | ◎ |
| | 59 | NiO | 5 | 0 | ◎ ◎ ◎ | 17 | ◎ |
| | 60 | NiO | 5 | 0 | ◎ ◎ ◎ | 18 | ◎ |
| | 61 | NiO | 5 | 0 | ◎ ◎ ◎ | 17 | ◎ |

In the examples and the comparative examples in Table 1, except for sample No. 44 which does not contain glass composition, all the glass compositions were the same.

Samples No. 1-16 used Ni for the internal electrode and used NiO as the filler composition. Then, properly changed the content ratio of the filler composition and the conditions of the end surface polishing. The examples 1-13 control the conditions of the end surface polishing in a way that the drawing distance d of the glass composition will not be 1 μm or more. And the examples 14-16 changed the Ni recessing rate by changing the content ratio of the filler composition and the conditions of the end surface polishing.

The samples No. 17-26 used Ag for the internal electrode and used Ag$_2$O as the filler composition. Then, properly changed the content ratio of the filler composition and the conditions of the end surface polishing. The examples 17-23 control the conditions of the end surface polishing in a way that the drawing distance d of the glass composition will not be 1 μm or more. And the examples 24-26 changed the Ni recessing rate by changing the content ratio of the filler composition and the conditions of the end surface polishing.

The samples No. 27-35 used Cu for the internal electrode and used CuO as the filler composition. Then, properly changed the content ratio of the filler composition and the conditions of the end surface polishing. The examples 27-32 control the conditions of the end surface polishing in a way that the drawing distance d of the glass composition will not be 1 μm or more. And the examples 33-35 changed the Ni recessing rate by changing the content ratio of the filler composition and the conditions of the end surface polishing.

The samples No. 36-45 used Ni for the internal electrode. Here, samples No. 36-41 used metal oxide other than NiO as the filler composition. Sample No. 42 used metal particles (Fe particles) instead of the ceramic filler. Sample No. 43 used heat resistant resin particles instead of the ceramic filler. Polyimide resin was used as the heat resistant resin. Sample No. 44 formed the insulating layers 16 with barium titanate (non-glass) only. Sample No. 45 did not use the ceramic filler.

According to Table 1, when the metal used for the internal electrode was the same kind with the metal in the metal oxide contained in the filler composition, the average strain was 8 mm or more, and the result of the strain strength experiment was good. Furthermore, when the content ratio of the filler composition was 0.1-20 wt %, the average strain was 12 mm or more, and the result of the strain strength experiment became better. Furthermore, when the content ratio of the filler composition was 0.1-10 wt %, the average strain was 15 mm or more, and the result of the strain strength experiment became even better.

Moreover, the examples with a Ni recessing rate of 5% or more had better average strain, comparing with the examples in which the content ratio of the filler composition was in equal degree and the Ni recessing rate was 0%.

On the contrary, when the metal element used for the internal electrode was different from the metal element in the metal oxide contained in the filler composition, or when metal oxide was not used as the filler composition, all the average strains were less than 8 mm, and the results of the strain strength experiments were insufficient.

The samples No. 46-61 in Table 2 are specific examples which have fixed internal electrode of Ni, fixed filler composition type of NiO, fixed content of 5 wt % and fixed Ni recessing rate of 0%, and changed glass composition. In spite of the change in the glass composition, in all the examples, the average strain was 15 mm or more, and the result of the strain strength experiment is extremely good.

DESCRIPTION OF THE SYMBOLS 2, 102 Multilayer ceramic capacitor
3 Element body
4 Ceramic sintered body
6 The first external electrode
8 The second external electrode
10 Inside dielectric layer
10a Dielectric layer end
11 Exterior region
12 Internal electrode layer
12a Internal electrode layer end
12A, 12B Extraction section
13 Interior region
14 Capacity region
15A, 15B Extraction region
16 Insulating layer
16a Covering section
104 Substrate
106 Pressing tool
114 Pad section
118A, 118B Experiment terminal
120 Pressing part

The invention claimed is:

1. A multilayer electronic component comprising:
an element body where a plurality of internal electrode layers and dielectric layers are alternately laminated, the internal electrode layers containing a metal M; and
an insulating layer disposed on at least one side surface of the element body, the insulating layer containing a glass composition and a ceramic composition that contains an oxide of the metal M,
wherein 5% or more of an end of the internal electrode layer near the side surface equipped with the insulating layer is recessed 1 μm or more from an end of the dielectric layer near the side surface equipped with the insulating layer.

2. The multilayer electronic component according to claim 1, wherein the oxide of the metal M is NiO, $Ag_2O$ or CuO.

3. The multilayer electronic component according to claim 2, wherein when the whole insulating layer is 100 wt %, the content of the oxide of the metal M in the insulating layer is 0.1-20 wt %.

4. The multilayer electronic component according to claim 3, wherein when the whole glass composition is 100 wt %, the $SiO_2$ content in the glass composition is 35-75 wt %.

5. The multilayer electronic component according to claim 3, wherein when the whole glass composition is 100 wt %, the content of the alkali metal composition in the glass composition is 10-35 wt %.

6. The multilayer electronic component according to claim 2, wherein when the whole glass composition is 100 wt %, the $SiO_2$ content in the glass composition is 35-75 wt %.

7. The multilayer electronic component according to claim 2, wherein when the whole glass composition is 100 wt %, the content of the alkali metal composition in the glass composition is 10-35 wt %.

8. The multilayer electronic component according to claim 1, wherein when the whole insulating layer is 100 wt %, a content of the oxide of the metal M in the insulating layer is 0.1-20 wt %.

9. The multilayer electronic component according to claim 8, wherein when the whole glass composition is 100 wt %, the $SiO_2$ content in the glass composition is 35-75 wt %.

10. The multilayer electronic component according to claim 8, wherein when the whole glass composition is 100 wt %, the content of the alkali metal composition in the glass composition is 10-35 wt %.

11. The multilayer electronic component according to claim 1, wherein when the whole glass composition is 100 wt %, a $SiO_2$ content in the glass composition is 35-75 wt %.

12. The multilayer electronic component according to claim 1, wherein when the whole glass composition is 100 wt %, a content of alkali metal composition in the glass composition is 10-35 wt %.

* * * * *